(12) United States Patent
Freeman

(10) Patent No.: US 6,950,826 B1
(45) Date of Patent: *Sep. 27, 2005

(54) MATERIAL AND SUPPLIES ORDERING SYSTEM

(76) Inventor: Craig Freeman, P.O. Box 390506, Anza, CA (US) 92539

( * ) Notice: Subject to any disclaimer, the term of this patent is extended or adjusted under 35 U.S.C. 154(b) by 0 days.

This patent is subject to a terminal disclaimer.

(21) Appl. No.: 09/545,991

(22) Filed: Apr. 10, 2000

Related U.S. Application Data

(63) Continuation of application No. 09/197,191, filed on Nov. 20, 1998, now Pat. No. 6,134,557.

(51) Int. Cl.$^7$ ................................................ G06F 17/50
(52) U.S. Cl. ............................ 707/102; 705/8; 705/22; 705/28; 705/29
(58) Field of Search ............................ 707/102; 705/8, 705/22, 28, 29, 7, 9; 700/100

(56) References Cited

U.S. PATENT DOCUMENTS

| | | | |
|---|---|---|---|
| 4,734,858 A | * | 3/1988 | Schlafly ........................ 705/26 |
| 5,664,115 A | | 9/1997 | Fraser |
| 5,682,525 A | | 10/1997 | Bouve et al. |
| 5,710,887 A | | 1/1998 | Chilliah et al. |
| 5,715,314 A | | 2/1998 | Payne et al. |
| 5,724,424 A | | 3/1998 | Gifford |
| 5,799,285 A | | 8/1998 | Klingman |

(Continued)

OTHER PUBLICATIONS

Logica's Integration and Automatin of Work Management System Gives SaskEnergy Competitive Advantage. "Business Wire." (Sep. 15, 1997) pp. 1–2.*

Nobumasa Nakadaira et al., "Internet Electronic Commerce system 'Infomerce System,'" OKI Technical Review 160, vol. 63, p. 9–12, Jan. 1998.
Peapod, Inc., pages from www.peapod.com Nov. 13, 1996.
Peapod, Inc., pages from www.peapod.com, Feb. 13, 1997.
Peapod, Inc., pages from www.peapod.com, Feb. 18, 1997.
Peapod, Inc., pages from www.peapod.com, Apr. 14, 1997.
Peapod, Inc., pages from www.peapod.com, Jun. 29, 1998.
David Radin, "Electronic Mall Syndrome Gives Way to Unified Buying," eBusiness News, May 14, 1998.
Sears, Roebuck and Co., pages from www.sears.com, Jan. 22, 1997.
Sears, Roebuck and Co., pages from www.sears.com, Apr. 12, 1997.
Sears, Roebuck and Co., pages from www.sears.com, Dec. 10, 1997.
Sears, Roebuck and Co., pages from www.sears.com, Feb. 1, 1998.
Sears, Roebuck and Co., pages from www.sears.com, May 20, 1998.

*Primary Examiner*—James W. Myhre
(74) *Attorney, Agent, or Firm*—Michael Klicpera

(57) ABSTRACT

A method for facilitating the ordering of construction supplies by a customer over the Internet is provided. The method comprises: receiving a supplier reference indicating a supplier; providing the customer with a phase list comprising references to each of a plurality of construction phases; receiving a customer selection of a construction phase from the phase list; providing the customer with a supply list comprising references to a plurality of supplies associated with the selected construction phase, the plurality of supplies being available from the indicated supplier; allowing the customer to make a supply selection of at least one supply from the supply list; recording the supply selection; listing the supply selection; allowing the customer to remove supply selections from the listing; and transferring the list to the indicated supplier in response to an order send command.

49 Claims, 5 Drawing Sheets

U.S. PATENT DOCUMENTS

| | | | |
|---|---|---|---|
| 5,806,069 A | * 9/1998 | Wakiyama et al. | ......... 707/102 |
| 5,826,242 A | 10/1998 | Montulli | |
| 5,895,454 A | 4/1999 | Harrington | |
| 5,918,213 A | 6/1999 | Bernard et al. | |
| 5,923,552 A | * 7/1999 | Brown et al. | ............... 700/100 |
| 5,970,472 A | 10/1999 | Allsop et al. | |
| 6,055,513 A | 4/2000 | Katz et al. | |
| 6,085,177 A | 7/2000 | Semple et al. | |
| 6,134,557 A | * 10/2000 | Freeman | ..................... 707/102 |

* cited by examiner

FOOTING AND SLAB

| DATE | NO. | DISCRIPTION | QUANTITY |
|------|-----|-------------|----------|
|      | 1   | LAYOUT FOR FOOTING | 800 |
|      | 2   | DIGGING FOOTING | 275 |
|      | 3   | FORMING FOR CONCRETE | 275 |
|      | 4   | INSTALLING HARDWARE | 275 |
|      | 5   | CONCRETE FOOTING | 26 |
|      | 6   | CLEANUP FOOTING | 21 |

ORDER LIST

P.O. NO. _____

LAST NAME _____
FIRST NAME _____
E-MAIL ADDRESS: _____
    STREET _____
    CITY _____
    STATE _____ ZIP _____
BILLING ADDRESS: _____
    STREET _____
    CITY _____
    STATE _____ ZIP _____
TELEPHONE NO. (___) ___ _____
CREDIT CARD: VISA_ MC_ AM EXP_ DISCOV._
EXPIRATION DATE: __/__
CREDIT CARD # _____
CONTRACTOR/ CUSTOMER
ACCOUNT NUMBER: _____

MATERIALS/SUPPLIES OREDERED

| QTY. | DESCRIPTION | SKU | BARCODE | VENDOR PART NO. |
|------|-------------|-----|---------|-----------------|
| NAME | | | | |
| ____ | _____ | ____ | ____ | _____ |
| ____ | _____ | ____ | ____ | _____ |
| ____ | _____ | ____ | ____ | _____ |
| ____ | _____ | ____ | ____ | _____ |

DELIVERY DATE __/__/__
DELIVERY LOCATION
STREET _____
CITY _____
STATE _____ ZIP _____

PAGE 1 OF N

MATERIAL AND SUPPLIES ORDERING SYSTEM

CROSS REFERENCE TO RELATED APPLICATIONS

The present application is a continuation of patent application Ser. No. 09/197,191 filed on Nov. 20, 1998 now U.S. Pat. No. 6,134,557, entitled "Materials and Supplies Ordering System" that is currently pending. The parent application is incorporated herein by this reference.

FIELD OF THE INVENTION

The present invention relates to methods and a system for assisting contractors or consumers to use computer equipment to facilitate ordering supplies from a merchant or supply vendor. More particularly, this invention relates to a computer program that creates and displays a multi-level categorization table for entering contractor supply order data which calculates the appropriate SKU, bar code, universal product code or part number, and transfers this information in electronic, softcopy or hardcopy format to the supply merchant or vendor to facilitate the filling and possible also the delivery of any such contractor order over the internet, a modem, or by mail or hand delivery of a software disk or hardcopy.

BACKGROUND OF THE INVENTION

When a contractor or customer desires to purchase materials for building, constructing or modifying a residential home, condominium, apartment or office complex, the contractor or customer must evaluate the construction phase and determine what materials or supplies will be necessary to accomplish the goal of completing the project. Generally, even the smallest construction project requires a significant number of materials and supplies and one of the first steps in any construction project is the procurement of such materials and supplies. Typically, the contractor or customer must personally go to the vendor's or merchant's store, locate the appropriate materials and physically load the materials on a cart or vehicle for purchasing. When navigating through the vendor's store to locate the necessary materials and supplies that are available for sale, the procurement process may be tedious because the materials usually are spread throughout the store. Due to the number of materials and supplies and the specific quantity of each, this inefficient procurement method forces the contractor or customer to spend many hours in locating, selecting and purchasing of such materials. Furthermore, since the particular stores are open usually during the daylight and evening hours, the contractor or customer cannot order materials or supplies at a more convenient time, such as late at night or early in the morning. In addition, the contractor or customer must not only purchase a variety of materials and supplies, but must also personally load them on an appropriate vehicle or make arrangements to have the materials delivered to the site of construction. Also when constructing an entire building, there are a number of phases, e.g. foundation, plumbing, framing, roofing, etc. Therefore, the general contractor or customer must perform this inefficient ordering and purchasing process a number of times.

With the advent of large hardware and lumber supply merchants or vendors, such as Home Depot, Homebase, or Eagle Hardware the smaller hardware and lumber stores have been diminishing in numbers. While the smaller hardware may offer more services to compete with large vendors and the less competition might not offer the contractors or customers the best prices, there are several advantages. One particular advantage of the large stores that relates to this invention, is a standardization of identification of supply materials. Home Depot, Home Base, or Eagle Hardware have a standardized list of all materials for sale by a specific name, SKU code, part number, universal product code, and/or bar code. This opens the opportunity for a more advanced and efficient means to order supply materials from large merchants for construction projects.

SUMMARY

The present invention comprises a computer program which displays a number of objects in some form of organized, often hierarchial, fashion. Employed is a common system found in a variety of hardware/software computer systems and applied in a variety of different contexts known as a categorization table. The present invention's categorization table organizes data under successive and expandable levels of categorized headings, assigns the appropriate vendor specific names, SKU codes, part numbers, universal product code, and/or bar codes, and then transfers this specific information to a merchant or vendor for processing of the order. Such headings give relevant information to the user as to the nature of the underlying construction project and/or data grouped under particular headings at a given level or construction. The user is also able to manipulate the data or to select objects for appropriate actions (starting a program, printing a construction material supply list, transferring a generated list(s) to the vendor/merchant, etc.).

By interacting with the categorization table, a user may create a customized table with the current data comprising identification of supply materials and quantity of data being displayed under expanded headings or subheadings while non-current data remains unseen because the entire categorization table is unable to be displayed within the confines of the window boundaries. Once the categorization table is completed, a number of reports can be generated from the program. A first report that is generated from the complete categorization table, is a material and supply list which details the vendor/merchant specific names, stock keeping unit (SKU) codes, vendor part numbers, universal product code, and/or bar codes and quantity requested for each material listed on the table. A second report can be generated which lists the number of hours of labor in man/hours calculated for the specific construction project or phase shown in the completed categorization table. The first report also provides contractor identification information (name, address, telephone number) and specific job number, and accounting information (purchase order number or credit card number). Furthermore, this first report is then transferred to the identified vendor/merchant for processing, and possible delivery of materials and supplies, including confirmation of the order.

Computer shopping represents an increasing part of the economy. The growth in its popularity can in part be explained because customers have learned that goods purchased from a catalog are often much less expensive than if purchased through a normal retail store. In addition, because a customer can shop without leaving the comfort of their home or office, placing an order for material supplies from a computer makes much more efficient use of the contractor's/customer's time.

Shopping for material and supplies using a personal computer to place an order on a network is a natural extension to the more traditional catalog shopping, since the customer enjoys these same benefits. The COMPUSERVE or AMERICA ONLINE network and other private networks have long offered members the opportunity to browse through on-line "Electronic Shopping Malls" and place orders for goods shown and described therein. New opportunities for shopping via personal computer arise daily as more people gain access to the Internet network, with its interconnectivity and easy access through the World Wide Web or E-mail.

It is an object of the present invention to provide a solution to the problem of inefficient procurement of materials and supplies by direct ordering. Utilizing the present inventions computer ordering program, the contractor or customer enters into a categorization table all materials and supplies including the specific quantities required for a particular phase of a construction project, and then transfers over the telephone, other network computer disk or hardcopy, the order that includes the contractor's/customer's specific supply material request and financial information in a format that can be readily processed by the vendor or merchant.

These and other objects and features of the present invention will become more fully apparent from the following description and appended claims or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is an exemplary partial categorization table on a computer screen for one phase of a construction project that includes blocks for entering data into the table for calculating the appropriate standardized name, SKU, universal product code or bar code for creating a detailed list to be transferred to a remote vendor or merchant.

FIG. 4. is an exemplary material or supply report that is transferred to a specific vendor or merchant for processing.

DETAILED DESCRIPTION OF THE PREFERRED EMBODIMENTS

Figure 1:
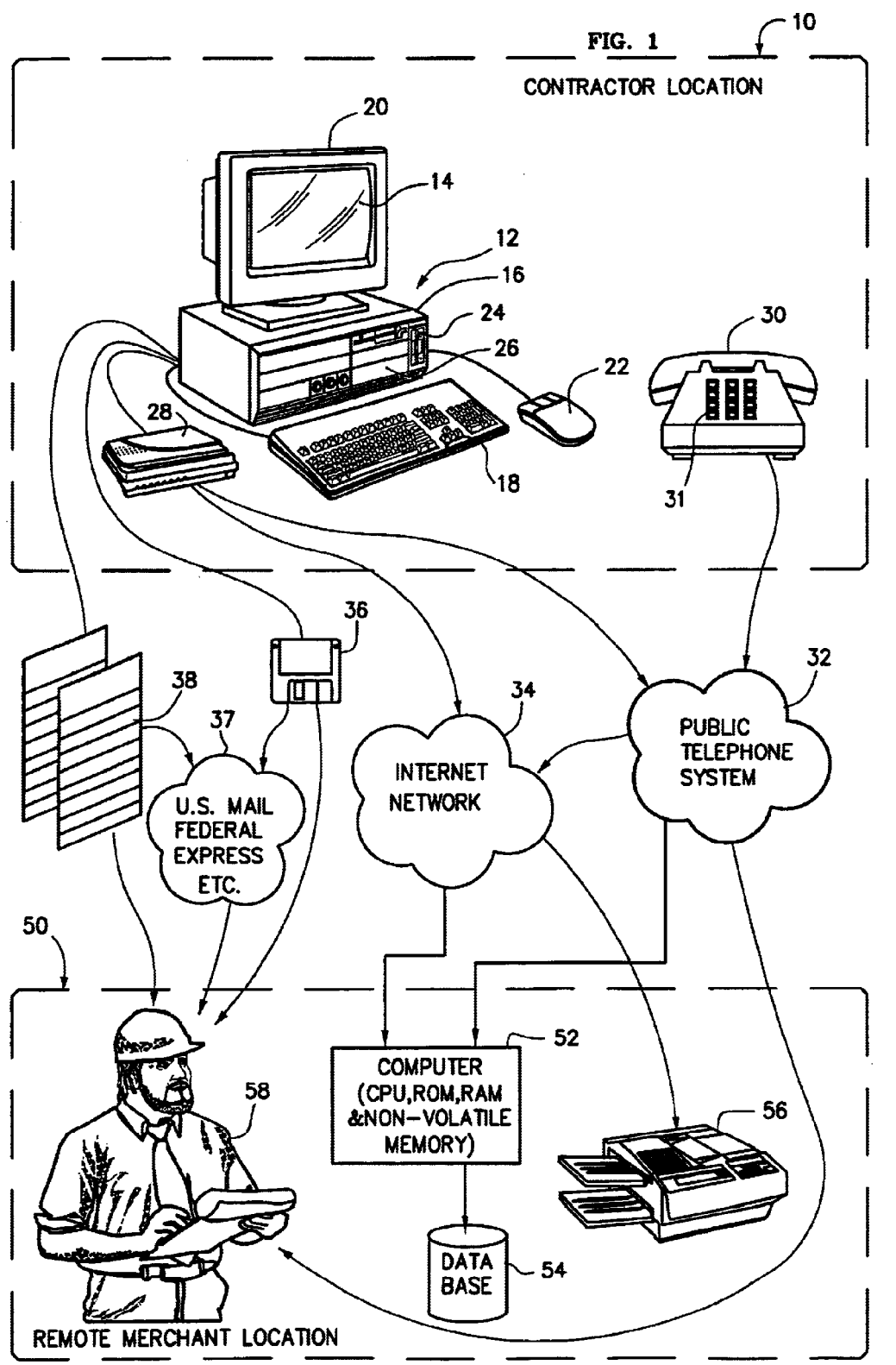
FIG. 1 is a conceptual overview block diagram, illustrating the components involved in the communication between the contractor or customer with a remote merchant, over a network, public telephone system, softcopy or hardcopy means to establish an order of materials or supplies for a construction project.

With reference to FIG. 1, the principal components used to implement the present invention are illustrated in a block diagram. At the top of the Figure, a dash line defines a customer location 10, which in many cases will be the customer's home or place of business. At the customer's location 10, a personal computer 12 is used to load the order program which displays a categorization table 14 in which various types of materials and/or supplies are entered for a given construction phase whereby a standardized name, SKU, universal product code, or bar code is assigned. Personal computer 12 is generally conventional in design, comprising a processor chassis 16 within which are disposed a central processor unit (CPU) and supporting integrated circuitry. Coupled to processor chassis 16 is a keyboard 18 and a monitor 20. Personal computer 12 is controlled by the customer using keyboard 18 and a mouse 22 (optional) or other pointing device that controls a cursor used to make selections in programs executed on the personal computer.

In the front panel of the processor chassis are mounted a floppy drive 24 and a hard drive 26. One or more serial ports are located near the rear panel for connecting an internal or external modem 28 for communication over standard telephone lines 32, the internet 34 or specialized cable or fiber optic means.

Although a desktop type of personal computer is illustrated in FIG. 1, it will be understood that a laptop or other type of portable computer, a "dumb" terminal, or a personal digital assistant can also be used in connection with the present invention for placing an order. In addition, a workstation on a local area network at the customer location can be used instead of personal computer 12 for placing an order. Accordingly, it should be apparent that the details of personal computer 12 are not particularly relevant to the present invention. Personal computer 12 simply serves as a convenient interface for accessing information about goods that can be purchased, and for placing an order over a network means.

Also disposed at customer location 10 is a generally conventional telephone 30. Preferably, telephone 30 includes a touch-tone keypad 31. However, a pulse-type telephone can also be used in connection with the present invention.

A number of private networks offer on-line shopping to members that are connected to the network. Typically, the member accesses the network over the telephone system, which is coupled to the personal computer through an internal modem (not shown) or an external modem 28. While the present invention is applicable to orders placed on such private networks, in FIG. 1, personal computer 12 is also shown connected to an Internet network 34.

Only recently have opportunities for shopping on the Internet network become widely available. The connection between personal computer 12 and the Internet can be through a modem 28 and telephone line 32 via a private network service provider that is directly connected to the Internet network, through an Internet service provider who is directly connected, or via a direct high-speed data connection. The details of the type of connection to the Internet network are of no consequence in the present invention.

Internet network 34 and public telephone system are depicted in FIG. 1 as an amorphous shape to suggest that the details of connection with the customer and the access made by the customer are continually evolving. By making a connection to the Internet network, the customer has the ability to access sites throughout the world at which are stored on-line catalogs that can be accessed by the customer.

Once the contractor or customer has indicated the materials and supplies, including quantities, to be purchased from a vendor or merchant, a standardized listing is generated by the ordering program and the order can be transmitted to an appropriate remote merchant location 50 via the standard telephone connections 32, the Internet network 34, or by computer disk 36 or hardcopy 38. Although the order can be placed in real time if the customer is directly connected to the remote merchant location through the Internet, for example via the World Wide Web, it is also possible that the customer will complete an order from which the goods and supplies were selected and transmit the order form as a specialized E-mail message to the remote merchant location through the Internet network.

An order received from customer location 10, which is exemplary of many other customer locations from which orders can be input to remote computer 52, is processed by the computer database management system 54 and custom software executing on the computer for storage in a database. This database is maintained on the non-volatile storage.

Computer 52 also processes data input by customers using a public telephone system 32. Again, the public telephone system is illustrated as having an amorphous shape to indicate that it is a complex system that can involve many thousands of components, including signals conveyed by land lines, satellite, and/or optical fibers. The details of the public telephone system are, however, not important in the present invention. It simply represents a communication link between the customer locations and remote merchant location 32 that is substantially more secure than a network such as the Internet.

An order received from customer location 10, can also be transferred to remote facsimile 56. In order to complete an order that has been generated by the categorization table, the contractor/customer is instructed on the order form or in the program to call a specific 800 (or other) number that is coupled to the remote merchant location. The customer makes the call using modem 28, which is coupled to public telephone system 22, or using any other public telephone. The public telephone system conveys the customer's call to facsimile 56.

An order received from customer location 10, can also be transferred to remote location 50 by mailing to the remote location or physically delivering a software disk 36 which contains the generated order list in software format or by hardcopy 38 for which the generated order list is printed on one or more pages to an attendant 58

Moving to FIG. 2 which demonstrates a portion of the categorization table generated by the ordering program on a computer screen. FIG. 2 shows just one phase that has been loaded into the memory of the computer for editing and processing. The ordering program contains categorization tables specific for several phases of a construction project, such as foundation and slab construction, framing, electrical, plumbing, etc. Each phase has a specific categorization table specific for each phase, but allows for further editing and modification of the table to meet the contractor's or customer's specific needs.

Figure 3A:
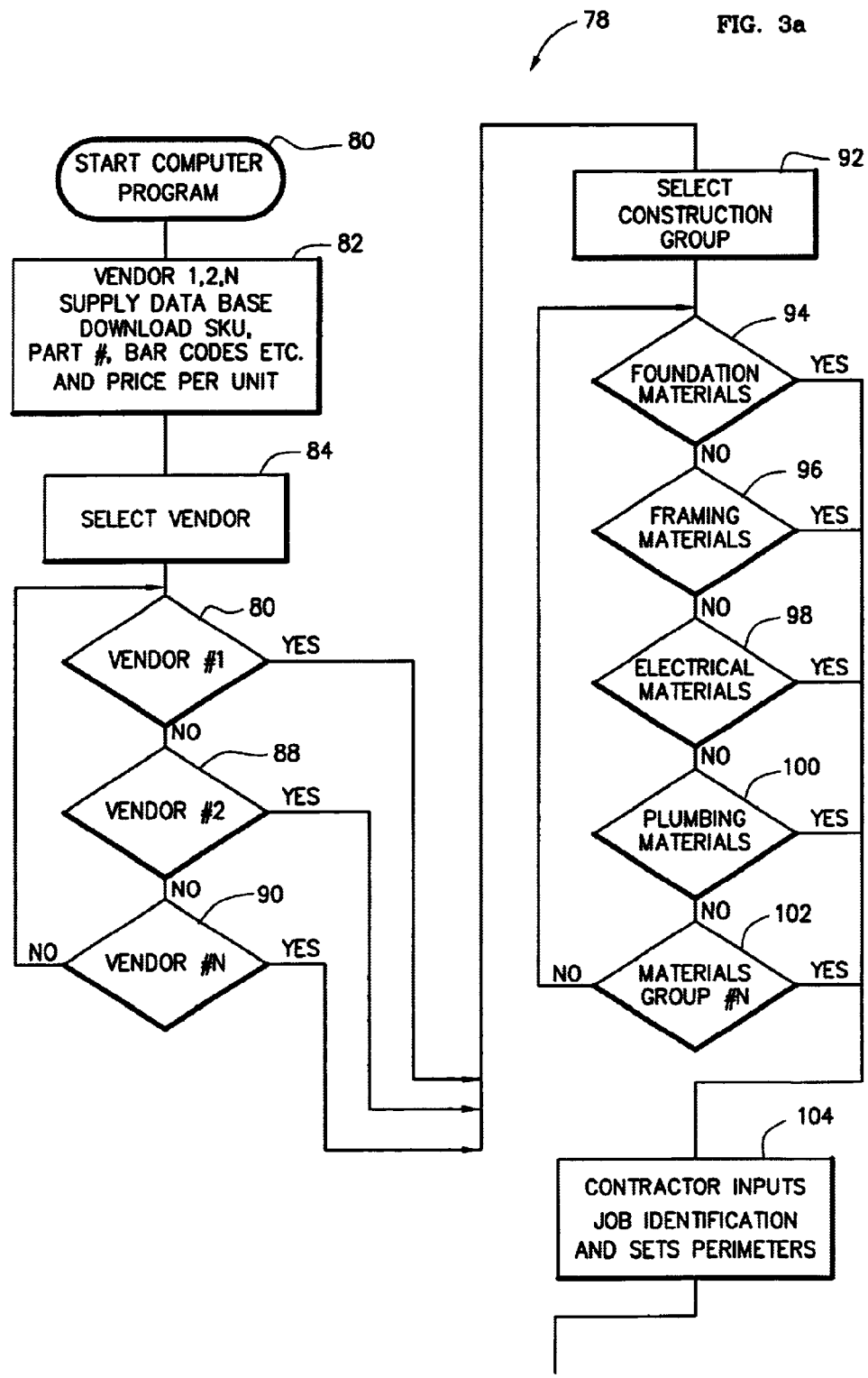
FIGS. 3a and 3b are a flow chart illustrating the steps implemented when using the computer generated categorization table for processing an order of construction materials and supplies with a remote vendor or merchant.
Figure 3B:
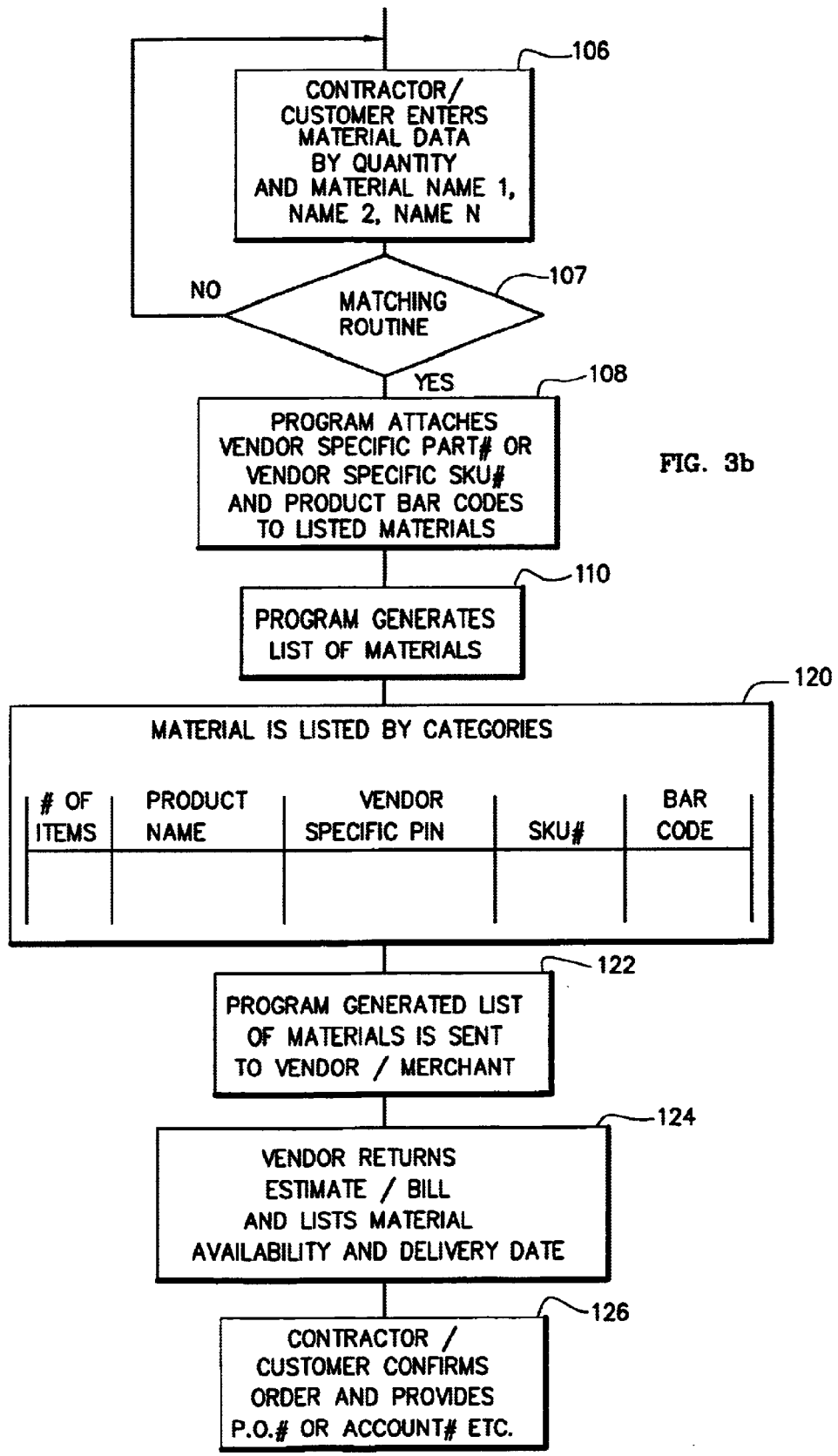

Further details of the construction/customer order program 78 for entering a construction project order over a network means are illustrated in the flow chart shown in FIGS. 3a and 3b, beginning at a start block 80. In a block 82, a vendor or merchant supply database containing the vendor's/merchant's specific part numbers, SKU numbers, universal product code, bar codes or pricing information can be input into a database which is linked to the categorization table by the ordering program 78. The supply database can be entered by hand using a printed list or other means, but preferably this information can be downloaded from the specific vendor over the internet network or public telephone lines. It is also possible to provide the supply information software floppy disk or CD-ROMs to prospective customers/contractor, enabling the customer/contractor to download the selected information into the ordering program 78. Pricing information supplied over a network means or disk format must be updated frequently for accuracy, but this is not essential because the order program completes a confirmation step with pricing information supplied by the vendor/merchant at the time the order is placed.

In a block 84, the ordering program 78 prompts the contractor/customer to select the vendor/merchant for which the ordering program will utilize the specific supply information to generate the ordering list. The program can list Vendor #1 86, Vendor #2 88, Vendor #N 90 for any merchant for which the supply information has been downloaded and available for the ordering program 78 to process information. Alternately, the ordering program can display an editing block for entering the vendor's/merchant's specific name. A means for downloading the specific vendor's supply data will be incorporated in the ordering program to allow the contractor to expand beyond the specific vendors provided with the program.

In the next step, described in a block 92, the contractor/customer selects the construction phase or group that the contractor/customer desires to order materials and supplies for completing the project. In block 94, construction phases for ordering materials and supplies in association with a foundation or slab, framing 96, electrical 98, plumbing 100 or additional 102 project phases. It can be appreciated by one skilled in the art that numerous other construction phases can be added to the ordering program. The ordering program 78 provides a specific format for each phase selected, but has provisions for modifying the categorization table to meet the contractors/customers particular needs. The program also allows the contractor/customer to select one or more construction phases at a single setting. In this capacity, the specific formats will be presented in the categorization table in a logical sequence or a sequence indicated by the operator.

After the preliminary vendor/merchant and construction phase information has been entered into the ordering program, the next step, described in block 104, allows the contractor to input job identification information and set various parameters. These parameters include, but are not limited to, the full name of the contractor/customer, a billing address, telephone number an E-mail address, the requested delivery site and date of delivery of the materials and supplies, credit card type, number, and expiration date, and/or purchase order number.

In the next step, described in block 106, the contractor or customer enters the material data by providing the material name 1 and quantity 1, material name 2 and quantity 2, material name N and quantity N until all the materials and supplies desired to be ordered for the particular construction phase have been entered into a database function of the ordering program. The program includes a means for assisting the contractor/customer in entering the proper name for the material or supply desired. The data entered on the computer might include a subset or portion of the complete material name or description. As block 107 indicates, the completion or correction of the entered name is accomplished by either a spelling check or name matching subroutine which evaluates the data entered and compares it with the vendor supplied database. If the correct material name is provided, the data is automatically printed on the computers screen or console and additional entering of data can be accomplished. If there are several possible matches to the data name entered, the subroutine of the ordering program prints a detailed list of the possible matches on the screen and provides a means for the contractor or customer to select the appropriate material or supply name. Such a means would include a highlighted cursor that can be moved over each possible material name until the proper name is highlighted and then pressing a key, such as the enter key, to select that particular name. These steps described in block 106 and 107 are repeating routines that allow the contractor to enter a material name and quantity, initiates the matching subroutine and when the final material name is selected, provides a means for entering the next material name into the database function. When the contractor has completed entering all the material names which is desired for the particular phase of the ordering program, two icons which are always located on the computer's screen can be selected by the highlighting method described. The first icon represents a routine of the ordering program which allows the contractor or customer to select another vendor and construction group by restarting the program at step 84. The other icon prompts the contractor or customer to terminate further entry of material or supply data.

At this point, as represented in step 108, the ordering program attaches the vendor specific SKU number, vendor specific product number, universal product code, and/or the bar code for each material data and quantity entered into and accepted by the computer and recorded either temporarily or permanently into a database. It is contemplated by the applicant that additional information necessary for facilitating the ordering of materials and supplies from a vendor can be added to the ordering program. An alternate embodiment of this would be to run steps 106 and 108 consecutively after each data point is entered and accepted by the ordering program and then the ordering program attaches the vendor specific SKU number, vendor specific product number, universal product code, and/or bar code, building the database one entry at a time.

In the next step, described in blocks 110 and 120, the ordering program prints the material and supply database as a list printing the quantity or number of items, the product name, the vendor specific product number, the SKU number, universal product code, and /or bar code on the computer's screen for the contractor's or customer's review. The material is listed by vendor and categories or construction phases. At this time, editing of the information is made possible by the ordering program to correct any errors in the data presented. Once the contractor or customer is satisfied that all the materials and supplies necessary for the particular construction project are listed and incorporated into the database, an icon on the screen is available for highlighting and selecting which then transfers the contractor's entered job identification information and parameters as described in step 104 together with the listed database as described in step 110 and 120, to the particular vendor(s) selected in step 84. As described above for FIG. 1 and incorporated herein, the means for transferring this material and supply information can be by modem 28 over the public telephone system 32 or internet network 34 in an electronic format. Alternately, the information can be transferred by a printed hard copy 38 or computer disk 36 to the specific vendor 50. At this point the order is not complete but rather an offer by the contractor or customer to purchase the materials and supplies on a given date and possibly for a given delivery site and date.

The vendor can then review the material supply information by a number of methods, the most efficient being downloading the information to the vendor's computer system 52 and database 54 for processing. It is contemplated by the applicant that this information can be sent to a regional vendor warehouse specializing in processing this advanced and efficient ordering method for construction materials.

With reference to block 124, after the vendor has received the material and supply order from the contractor or customer and has evaluated their quantity of materials and supplies, shipping availability, etc. the vendor can return to the contractor or customer by any of the means described above for transferring the material information from the contractor/customer to the vendor, a confirmation document which provides a quote or estimate for the supplies and materials, lists the availability of such supplies and materials and if requested, provides the delivery date. It is contemplated by the applicant that the materials and supplies may be delivered in installments, that is, some materials delivered on one date and other materials on another date. Provisions are made in the ordering program for generating a list detailing different installment delivery dates for a specific group of materials.

In the next step, as depicted in block 126, after the contractor or customer reviews the estimate, bill and delivery dates from the vendor and agrees with the terms and provisions provided within, then the contractor/customer can contact the vendor by telephone 30, e-mail over the internet 34 or by facsimile 56 to finalize the transaction. This final step authorizes the vendor to make appropriate changes to the contractor's or customers account or credit card and consummate the delivery of the materials and supplies as dictated by the above transaction. No further communication is necessary, but additional exchange of information can be conducted to further the delivery of the ordered materials and supplies to the deliver site.

Presented on FIG. 4 is an example of the database supply and material list that is generated from step 122. This example is presented as a hardcopy format for ease of review, but as described herein, the database supply and material list is preferably in an electronic format that can be delivered to a facsimile, sent by mail or in person a floppy disk, or downloaded over the internet or public telephone system to the vendors computer 52 for processing into the vendors database 54. This database supply and material list is entitled "Order List" on FIG. 4. But it can be appreciated by one skilled in the art that any other relevant title can be employed. The listing generally provides the information necessary for the vendor to process the order. Therefore, the contractor's or customer's name, address and contact information, billing and other financial information, the complete list of materials and supplies including the quantity, part description, SKU, bar code, and/or vendor part number, and the requested delivery date and location is included in the generated list. It can be appreciated by the artisan that the order and configuration of the items of this list is not necessarily restricted to that presented in FIG. 4. Various formats displaying the pertinent information can be employed to meet the vendor's or merchant's or desired specifications without departing from the object of the present invention. Furthermore, as depicted in FIG. 4, the list may comprise one or more pages to accommodate primarily the number of goods or supplies ordered.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow. The categorization table may be created by a computer program product directing and controlling a general purpose computer. The computer program product will consist of some medium such as magnetic floppy disks or CD-Rom (or downloaded to a hard disk by a floppy disk, CD-Rom, e-mail or over the internet) having computer readable program code means to configure the computer. The program code means will configure or cause the computer to create and display the categorization table on an appropriate display means, generate the appropriate database and material and supply listing, and transfer this information by any means described herein for facilitating the order.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

I claim:

1. A contractor/customer ordering computer program product, tangibly embodied on a machine-readable medium, comprising instructions operable to:
   initiate a contractor/customer ordering computer program;
   receive contractor/customer identification information entered by a contractor/customer in response to a display initiated by the ordering program;
   display a menu from which the contractor/customer selects a classification of construction materials or products, the classification associated with a construction phase;
   cause the contractor/customer to select a set of construction materials or products within the classification;
   display a set of specific material or product names corresponding to the selected set of construction materials or products, the set of specific material or product names being dependent on an identified regional supplier such that the set includes only names of specific materials or products that are offered by the identified supplier;
   in response to the contractor/customer selecting one or more of the displayed specific material or product names and a specific quantity desired for each selected specific material or product name, record the specific material or product name and a quantity for each specific material or product name selected;
   generate a list displaying the specific material or product name and the quantity for each specific material or product name selected; enable the contractor/customer to access at least one of a SKU number, a UPC, a bar code, or a material or product number for each individual material or product name selected; and
   cause data corresponding to the list and data pertaining to contractor/customer identification information entered into the ordering program to be submitted to the identified regional supplier.

2. The contractor/customer ordering computer program product of claim 1 wherein the step of causing data corresponding to the list and data pertaining to contractor/customer identification information to be submitted to the identified supplier is performed by the contractor/customer ordering computer program itself by directly submitting the data from the list and the data pertaining to contractor/customer identification information to the identified supplier.

3. The contractor/customer ordering computer program product of claim 1 wherein the material or product number, SKU number, UPC, or bar code is specific to the identified supplier.

4. The contractor/customer ordering computer program product of claim 1 wherein the data corresponding to the list and the data pertaining to contractor/customer identification information is submitted electronically.

5. The contractor/customer ordering computer program product of claim 1 wherein the data corresponding to the list and the data pertaining to the contractor/customer identification information is submitted by facsimile transmission.

6. The contractor/customer ordering program product of claim 1 wherein the identified regional supplier is part of a national chain.

7. The contractor/customer ordering program product of claim 1 further comprising instructions for downloading a current list of costs for each specific material or product from the identified supplier.

8. The contractor/customer ordering program product of claim 1 further comprising instructions for returning a cost estimate from the identified supplier to the contractor/customer.

9. The contractor/customer ordering program product of claim 1 further comprising instructions for requesting a date of delivery of the construction materials or products from the identified supplier.

10. The contractor/customer ordering program product of claim 1 further comprising instructions for providing confirmation of receipt of data from the identified supplier to the contractor/customer.

11. The contractor/customer ordering program product of claim 1 wherein the construction phase comprises at least one of a foundation, plumbing, electrical, framing, and roofing materials or products phase.

12. The contractor/customer ordering program of claim 1 wherein the steps recited therein are performed consecutively.

13. The contractor/customer ordering program product of claim 1 wherein the identified regional supplier is associated with a national chain.

14. The contractor/customer ordering program product of claim 1 wherein the menu displays a classification of construction materials or products associated with construction phases comprising foundation, plumbing, electrical, framing, and roofing phases.

15. A method for communicating construction material data or construction product data from a contractor/customer to a supplier of construction materials or products, the method comprising:
   initiating a contractor/customer ordering computer program;
   entering data in response to a display initiated by the ordering program;
   selecting a classification of construction materials or products from a menu displayed by the ordering program, the classification associated with a construction phase;
   selecting a set of construction materials or products within the classification;
   the ordering program displaying a set of specific material or product names corresponding to the selected construction materials or products, the set of specific material or product names being dependent on a regional supplier such that the set includes names of specific materials or products that are offered by the regional supplier;

selecting one or more of the displayed specific material or product names and a quantity desired for each selected specific material or product name, the ordering program recording at least one of the specific material or product name, a material or product number, a SKU number, a UPC, a bar code, and the quantity for each specific material or product name selected;

the ordering program generating a list displaying the at least one of the specific material or product name, the material or product number, the SKU number, the UPC, the bar code, and the quantity for each specific material or product name selected; and the ordering program causing data corresponding to the list and data pertaining to contractor/customer identification information entered into the ordering program to be submitted to the regional supplier.

16. The method of claim 15 wherein causing data corresponding to the list and data pertaining to contractor/customer identification information to be submitted to the supplier is performed by the contractor/customer ordering computer program itself by directly transferring the data from the list and the data pertaining to contractor/customer identification information to the supplier.

17. The method of claim 15 wherein the product number, SKU number, UPC, or bar code is specific to the supplier.

18. The method of claim 15 wherein the ordering program allows causes the data corresponding to the list and the data pertaining to contractor/customer identification information to be submitted electronically.

19. The method of claim 15 wherein the ordering program causes the data corresponding to the list and the data pertaining to the contractor/customer identification information to be submitted by facsimile transmission.

20. The method of claim 15 wherein the regional supplier is part of a national chain.

21. The method of claim 15 wherein the ordering program downloads a current list of costs for each specific material or product from the supplier.

22. The method of claim 15 wherein the ordering program returns a cost estimate from the supplier to the contractor/customer.

23. The method of claim 15 further comprising requesting a date of delivery of the construction materials or products from the supplier.

24. The method of claim 15 wherein the ordering program causes a confirmation of receipt of data from the supplier to the contractor/customer.

25. The method of claim 15 wherein the construction phase comprises one or more of a foundation, plumbing, electrical, framing, and roofing materials or products phase.

26. The method of claim 15 wherein the steps recited therein are performed consecutively.

27. The contractor/customer ordering program product of claim 15 wherein the identified regional supplier is associated with a national chain.

28. A system comprising a contractor/customer ordering computer programmed to be accessible by a contractor/customer computer, the ordering computer interconnected to a publicly accessible network means:

the ordering computer being programmed to initiate a contractor/customer ordering computer program;

the ordering computer being programmed to receive data entered by a contractor/customer in response to a display on the contractor/customer computer initiated by the ordering computer program;

the ordering computer program being programmed to cause a display of a menu on the contractor/customer computer from which the contractor/customer can select a classification of construction materials, products or supplies, the classification being associated with a construction phase, and upon selection of a classification, to cause a display of a menu of a set of construction material or product materials, products or supplies within the classification;

the ordering computer being programmed to cause a display on the contractor/customer computer of a set of material, product or supply names, the set of material or product names being dependent on an identified regional supplier such that the set includes names of specific materials, products or supplies that are provided by the identified regional supplier;

the ordering computer being programmed to allow selection of one or more of the displayed selected material or product names and a quantity desired for each material or product name, the ordering computer being programmed to record and list the material, product or supply names and the quantity for each material, product or supply-name selected; and the ordering computer being programmed to enable the contractor/customer to access at least one of a SKU number, a UPC, a bar code, and a material, product or supply number for each specific material, product or supply name selected.

29. The system of claim 28 wherein the ordering computer is programmed so that the recited steps are performed consecutively.

30. A method for facilitating the ordering of construction supplies by a customer over the Internet, the method comprising:

receiving a supplier reference indicating a regional supplier;

providing the customer with a phase list comprising references to each of a plurality of construction phases;

receiving a customer selection of a construction phase from the phase list;

providing the customer with a supply list comprising references to a plurality of supplies associated with the selected construction phase, the plurality of supplies being available from the indicated regional supplier;

allowing the customer to make a supply selection of at least one supply from the supply list;

recording the supply selection;

listing the supply selection;

allowing the customer to remove supply selections from the listing; and submitting the list to the indicated regional supplier in response to an order send command over the Internet.

31. The method of claim 30, wherein the phase list comprises at least one phase associated with constructing a building.

32. The method of claim 31, wherein the phase list comprises at least one phase selected from a wiring phase; a plumbing phase; a flooring phase; a kitchen and bath phase; a lighting phase; a foundation phase; a siding phase; a heating and cooling phase; and a windows and doors phase.

33. The method of claim 30, further comprising providing the customer with a supplier list and allowing the customer to select a supplier from the supplier list.

34. The method of claim 30, wherein the supply list includes tools.

35. The method of claim 30, wherein the listing includes for each supply selection, a part name and at least one of a merchant specific part number, a SKU, a universal product code, and a bar code.

36. A method for communicating and ordering materials, products and supplies from a regional supplier, comprising the steps of:

initiating a publicly accessible contractor/customer ordering computer program;

entering one or more material, product or supply names and a specific quantity desired for each material, product or supply into a categorization table;

said ordering program attaching a regional supplier's specific part number, part name, stock keeping unit (SKU), universal product code, or bar code for each material, product or supply entered; and said ordering program generating a list displaying the regional supplier's specific part number, part name, stock keeping unit (SKU), universal product code, or bar code and quantity for each material, product or supply.

37. The method as recited in claim 36, further comprising submitting said list to said regional supplier.

38. The method as recited in claim 36, wherein said ordering computer program is located remotely from a contractor's/customer's computer.

39. The method as recited in claim 36, wherein said contractor/customer accesses the ordering computer program over an internet or network system.

40. A method for communicating and ordering materials, products and supplies from a regional supplier, comprising the steps of:

initiating a publicly accessible contractor/customer ordering computer program;

selecting a regional supplier from a first menu displayed by said computer program;

entering one or more material, product or supply names and a specific quantity desired for each material, product or supply into a categorization table;

said ordering program attaching the selected regional supplier's specific part number, part name, stock keeping unit (SKU), universal product code, or bar code for each material, product or supply entered; and said ordering program generating a list displaying the selected regional supplier's specific part number, part name, stock keeping unit (SKU), universal product code, or bar code and quantity for each material, product or supply.

41. The method as recited in claim 40, further comprising the step of submitting said list to said selected regional supplier.

42. The method as recited in claim 40, wherein said ordering computer program is located remotely from the contractor's/customer's computer.

43. The method as recited in claim 40, wherein said contractor/customer accesses the ordering computer program over an internet or network system.

44. A method for communicating and ordering materials, products and supplies from a regional supplier, comprising the steps of:

initiating a publicly accessible contractor/customer ordering computer program;

said ordering program displaying a construction phase specific categorization table;

entering one or more material, product or supply names and a specific quantity desired for each material, product or supply into a categorization table;

said ordering program attaching the selected regional supplier's specific part number, part name, stock keeping unit (SKU), universal product code, or bar code for each material, product or supply entered; and said ordering program generating a list displaying the selected regional supplier's specific part number, part name, stock keeping unit (SKU), universal product code, or bar code and quantity for each material, product or supply.

45. The method as recited in claim 44, wherein said ordering computer program is located remotely from the contractor's/customer's computer.

46. The method as recited in claim 44, wherein said contractor/customer accesses the ordering computer program over an internet or network system.

47. A method for communicating and ordering materials, products and supplies from a regional supplier, comprising the steps of:

initiating a publicly accessible contractor/customer ordering computer program;

entering one or more material, product or supply names and a specific quantity desired for each material, product or supply into, said contractor/customer ordering program;

said ordering program attaching a regional supplier's specific part number, part name, stock keeping unit (SKU), universal product code, or bar code for each material, product or supply entered; and said ordering program generating a list displaying the regional supplier's specific part number, part name, stock keeping unit (SKU), universal product code, or bar code and quantity for each material, product or supply.

48. The method as recited in claim 47, wherein said publicly accessible ordering computer program is located remotely from the contractor's/customer's computer.

49. The method as recited in claim 41, wherein said contractor/customer accesses the computer program over a publicly accessible internet or network system.

* * * * *